United States Patent
Warren et al.

(10) Patent No.: US 8,338,561 B2
(45) Date of Patent: Dec. 25, 2012

(54) HIGH MELTING POINT POLYAMIDE

(75) Inventors: Dale R. Warren, Cumming, GA (US);
Nancy Singletary, Alpharetta, GA (US);
Mark G. Reichmann, Roswell, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 461 days.

(21) Appl. No.: 12/158,325

(22) PCT Filed: Dec. 22, 2006

(86) PCT No.: PCT/EP2006/070187
§ 371 (c)(1),
(2), (4) Date: Aug. 25, 2008

(87) PCT Pub. No.: WO2007/071790
PCT Pub. Date: Jun. 28, 2007

(65) Prior Publication Data
US 2009/0227760 A1    Sep. 10, 2009

Related U.S. Application Data

(60) Provisional application No. 60/752,957, filed on Dec. 23, 2005.

(51) Int. Cl.
  *C08G 69/26* (2006.01)
(52) U.S. Cl. ........ 528/340; 528/170; 528/310; 528/314; 528/322; 528/332; 528/335; 528/336; 528/338; 528/339; 528/347
(58) Field of Classification Search .......... 528/338, 528/339, 340, 347, 310, 170, 314, 322, 332, 528/335, 336
See application file for complete search history.

(56) References Cited

U.S. PATENT DOCUMENTS

| | | | | |
|---|---|---|---|---|
| 4,742,110 A * | 5/1988 | Sakashita et al. | ............. | 524/538 |
| 4,863,991 A * | 9/1989 | Poppe et al. | .................. | 524/606 |
| 4,948,868 A * | 8/1990 | Taguchi et al. | ............... | 528/339 |
| 5,670,608 A * | 9/1997 | Oka et al. | ...................... | 528/322 |
| 6,130,312 A * | 10/2000 | Murakami et al. | ............ | 528/339 |
| 2002/0183479 A1* | 12/2002 | Rulkens et al. | ............... | 528/310 |
| 2007/0232175 A1* | 10/2007 | Katayama et al. | ............ | 442/364 |

FOREIGN PATENT DOCUMENTS

| | | |
|---|---|---|
| EP | 217960 | 4/1987 |
| EP | 299689 | 1/1989 |
| EP | 744431 | 11/1996 |
| EP | 916687 | 5/1999 |
| JP | 2000017171 | 1/2000 |
| JP | 2000-186142 | 7/2000 |
| JP | 2000186142 A * | 7/2000 |

(Continued)

*Primary Examiner* — Michael L Leonard
(74) *Attorney, Agent, or Firm* — Oblon, Spivak, McClelland, Maier & Neustadt, L.L.P.

(57) ABSTRACT

Polyamide having a melting point between 330° C. and 370° C., said polyamide comprising:
  a diamine component (a) comprising between 0 and 55 mole %, based on the total number of moles of the diamine component (a), of at least one aliphatic diamine having more than 6 carbon atoms, and between 45 and 100 mole %, based on the total number of moles of the diamine component (a), of at least one aliphatic diamine having at most 6 carbon atoms, and
  a dicarboxylic acid component (b) comprising more than 50 mole %, based on the total number of moles of the dicarboxylic acid component (b), of terephthalic acid, with the exception of a certain specific polyamide (P*).

22 Claims, 1 Drawing Sheet

FOREIGN PATENT DOCUMENTS

| | | | |
|---|---|---|---|
| JP | 2000191771 A * | 7/2000 | |
| JP | 2000038444 | 8/2000 | |
| JP | 2000191771 | 11/2000 | |
| JP | 2002220462 | 9/2002 | |
| NL | 7014810 | 12/1970 | |
| WO | WO0125311 | 12/2001 | |

* cited by examiner

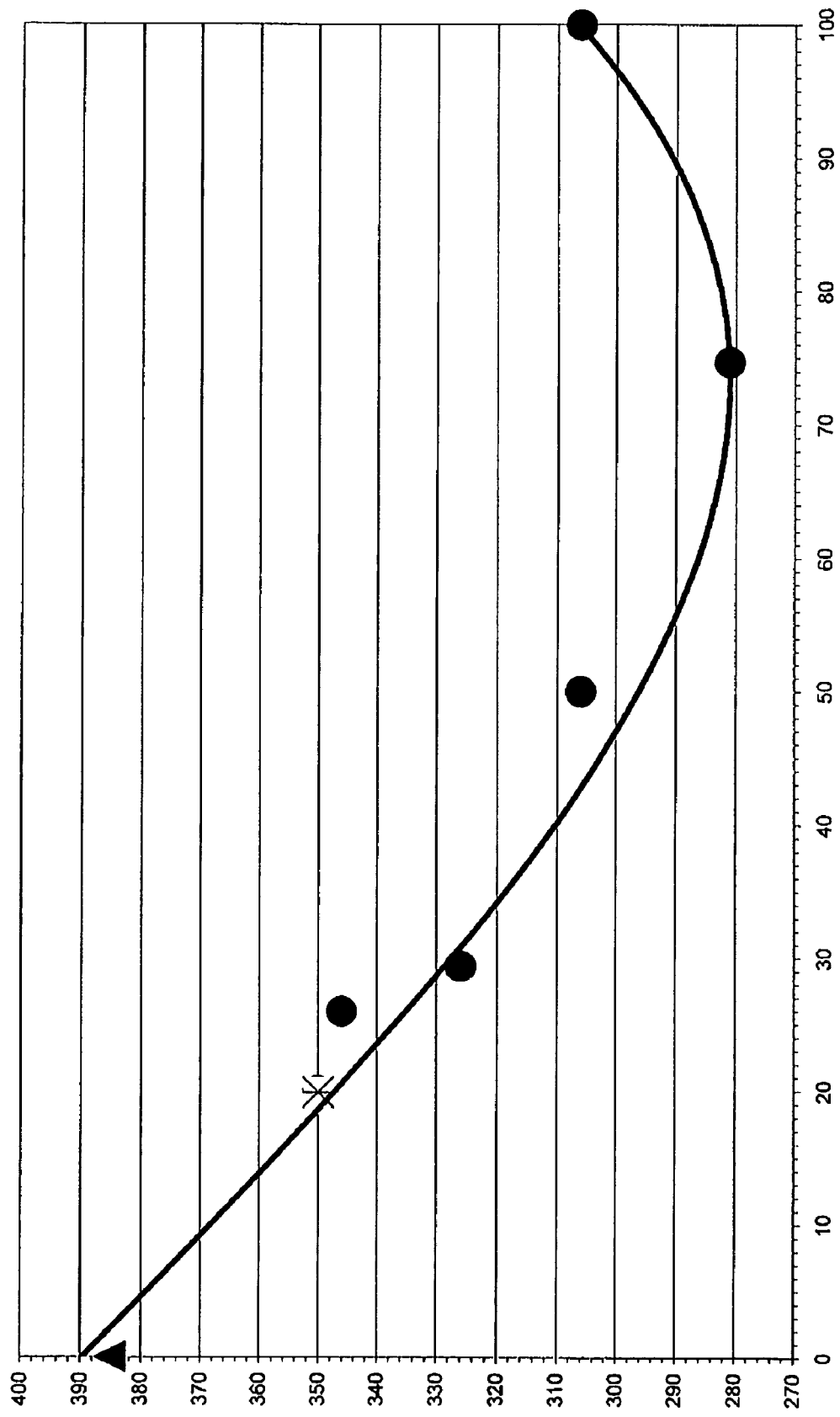

HIGH MELTING POINT POLYAMIDE

CROSS-REFERENCE TO RELATED APPLICATIONS

The present application is a 371 of PCT/EP06/70187 filed Dec. 22, 2006, and claims the benefit of U.S. application Ser. No. 60/752,957, filed Dec. 23, 2005. The whole content of U.S. application Ser. No. 60/752,957 is incorporated herein by reference.

The present invention relates to a polyamide having a very high melting point (above 330° C.), and which exhibits further advantageously a high heat deflection temperature, excellent heat resistance and melt stability, as well as improved moldability, high dimensional stability, outstanding mechanical and chemical resistance, profitably at a lower cost. The present invention also relates to a polyamide composition comprising the above polyamide, and to an article or a part of an article comprising the above polyamide or polyamide composition.

Over the last years, there has been a strong demand for the development of polyamides having a very high melting point, and that would further exhibit beneficially a high heat deflection temperature, an increased heat resistance and an increased melt stability, while retaining good moldability and excellent dimensional stability as well as attractive cost characteristics. These polyamides would be suitable for several highly demanding applications, like for instance for the manufacturing of electric or electronic parts, which require good flow-solder resistance, and car engine parts, which require better heat resistance year by year.

Aliphatic polyamides comprising ε-caprolactam as main component (PA 6) or 1,6-hexanediamine and adipic acid as main components (PA 6,6) have been widely used as general-purpose engineering plastics. However, these aliphatic polyamides exhibit poor heat resistance and poor dimensional stability because of, notably, a significant tendency to water absorption.

In order to meet the above mentioned requirements, other polyamides have been proposed and partly put into practical use, notably an aliphatic polyamide comprising 1,4-butanediamine and adipic acid as main components (PA 4,6) and a polyphthalamide comprising 1,6-hexanediamine and terephthalic acid as main components (PA 6,T). However, aliphatic polyamide PA 4,6 has high water absorption which causes fluctuation of dimensional stability during use, while polyphthalamide PA 6,T cannot be melt molded since its melting point is so high (i.e. 380-390° C.) that largely exceeds its decomposition temperature.

It is known that PA 6,T can be modified by incorporating relatively large amounts of adipic or adipic and isophthalic acid in combination with terephthalic acid, thus obtaining polyphthalamides (PA 6,T/6,6; PA 6,T/6,6/6,I) which have good melt moldability and yet pretty high melting point (typically in the range 290-320° C.). However, the incorporation of these additional dicarboxylic acids, which is effective in decreasing the melting point and improving the processability, may also decrease other properties like, notably, the rate of crystallization and the attainable degree of crystallization, thereby deteriorating obtainable properties such as rigidity under high temperatures, chemical resistance and dimensional stability. In particular the 1,6-hexanediamine/adipic acid amide link is thermally weak, that being liable for increasing degradation at temperatures approaching 300° C. and above.

It is also known that PA 6,T can be modified by completely replacing 1,6-hexanediamine with aliphatic diamines such as 1,9-nonanediamine and/or its branched isomer 2-methyl-1,8-octanediamine, thus obtaining PA 9,T polyphthalamides having fairly good moldability. However PA 9,T polyphthalamides suffer from a much too low melting point (about 305° C.). Furthermore their cost is very high due to the greater cost of the C9-diamine monomers.

U.S. Pat. No. 5,670,608 (to KURARAY) discloses specific moldable polyamides comprising a dicarboxylic acid component comprising not less than 60 mole % of terephthalic acid and a diamine component comprising not less than 60 mole % of 1,9-nonanediamine or of a specific mixture of 1,9-nonanediamine and 2-methyl-1,8-octanediamine. However, the highest melting points reported for these moldable polyamides do not exceed 317° C., i.e. well below 330° C.

JP 2000/191771 (also to KURARAY) addresses the problem of obtaining a polyamide improved in low water absorbability, chemical resistance, melt stability, heat deterioration resistance and toughness compared to conventional semi-aromatic polyamides such as PA6-T, and excellent in melt flowability as well. Per JP 2000/191771, this problem is solved, in a general manner, by polyamides composed of a dicarboxylic acid component containing 60-100 mole % of terephthalic acid and a diamine component containing 60-100 mole % of 1,6-hexanediamine and 1,9-nonanediamine and/or 2-methyl-1,8-octanediamine, wherein the diamine component contains 30-60 mole % of 1,9-nonanediamine plus 2-methyl-1,8-octanediamine. Section [0003] of JP 2000/191771 teaches that polyamides need to have a <<low>> melting point, from 280 to 320° C., to be usable in practice. The Applicant checked that polyamides according to this KURARAY's invention, containing at least 30 mole % of $C_9$ diamine(s), had well a melting point of 325° C. or lower. Examples 1 and 2 of JP 2000/191771 describe polyamides consisting of terephthalic acid as the diacid component, and of an equimolar mixture of hexamethylenediamine and of $C_9$ diamine as the diamine component (in details, the $C_9$ diamine of example 1 is 1,9-nonanediamine, while the $C_9$ diamine of example 2 is a mix of 1,9-nonanediamine and 2-methyl-1,8-octanediamine in a molar ratio of 5.7); these exemplified polyamides do not meet the problem addressed by the present invention, notably because they have a much too low melting point (of about 305° C.), similar to the one of the previously commented PA 9,T polyphthalamides. Finally, as comparative example 1 (with emphasis added on "comparative"), JP 2000/191771 describes a polyamide (P*) consisting of: (i) a diamine component (a*) consisting of 20 mole %, based on the total number of moles of the diamine component (a*), of 1,9-nonanediamine, and 80 mole %, based on the total number of moles of the diamine component (a*), of 1,6-hexamethylenediamine, and (ii) a dicarboxylic acid component (b*) consisting of terephthalic acid. Section [0047] of JP 2000/191771 teaches that this polyamide, the melting point of which is 350° C., would not be usable in practice, because it would be thermally unstable at its processing temperature, undergoing a particularly severe degradation during its pelletization "Although pelletizing was tried using the biaxial extruder of 370° C. of cylinder temperatures, the pyrolysis of a polyamide was remarkable, foaming, coloring, and a viscosity down were seen, and it was not able to be made a pellet configuration" (machine translated, op. cit).

Now, dismissing KURARAY's teachings, the Applicant has found that, in a quite unexpected manner, a polyamide having a melting point between 330° C. and 370° C., said polyamide comprising:

a diamine component (a) comprising between 0 and 55 mole %, based on the total number of moles of the diamine component (a), of at least one aliphatic diamine having more than 6 carbon atoms, and between 45 and 100 mole %, based on the total number of moles of the diamine component (a), of at least one aliphatic diamine having at most 6 carbon atoms, and a dicarboxylic acid component (b) comprising more than 50 mole %, based on the total number of moles of the dicarboxylic acid component (b), of terephthalic acid, was usable in practice. The invented polyamide exhibited further advantageously a high heat deflection temperature, excellent heat resistance and melt stability, excellent crystallinity, as well as improved moldability, high dimensional stability, outstanding mechanical and chemical resistance, and was profitably of lower cost.

BRIEF DESCRIPTION OF THE DRAWING

FIG. 1 shows the melting point in ° C. of certain polyamides as a function of their $C_9$ diamine molar content.

Thus, a first aspect of the present invention concerns the polyamide as above described, with the exception of a polyamide (P*) consisting of:

a diamine component (a*) consisting of 20 mole %, based on the total number of moles of the diamine component (a*), of 1,9-nonanediamine, and 80 mole %, based on the total number of moles of the diamine component (a*), of 1,6-hexamethylenediamine, and a dicarboxylic acid component (b*) consisting of terephthalic acid.

The melting point of the invented polyamide can be measured by any suitable technique known from the skilled in the art; very often, it is measured by Differential Scanning Calorimetry. Precisely, a Universal V3.7A Instruments DSC calorimeter was used by the Applicant to measure the melting point of the polyamide. For this purpose, it was preliminarily checked that the calorimeter was well-calibrated by means of a calibration sample. Then, the polyamide of which the melting point had to be measured was submitted to the following heating/cooling cycle: $1^{st}$ heating from room temperature up to 375° C. at a rate of 10° C./min, followed by cooling from 375° C. down to room temperature at a rate of 20° C./min, followed by $2^{nd}$ heating from room temperature up to 375° C. at a rate of 10° C./min. The melting point was measured during $2^{nd}$ heating. Melting is an endothermic first-order transition that appears as a negative peak on the DSC scan. The melting point was advantageously determined by a construction procedure on the heat flow curve: the intersection of the two lines that are tangent to the peak at the points of inflection on either side of the peak define the peak temperature, namely the melting point.

The melting point of the invented polyamide is preferably greater than 335° C. and more preferably greater than 340° C. Besides, it is preferably below 360° C., more preferably below 355° C., still more preferably below 350° C. and most preferably of at most 346° C.

In a certain preferred polyamide, the diamine component (a) comprises between 9 and 29 mole %, based on the total number of moles of the diamine component (a), of the aliphatic diamine having more than 6 carbon atoms.

The diamine component (a) comprises preferably at least 10 mole %, more preferably at least 15 mole %, still more preferably at least 20 mole %, still more preferably at least 22 mole %, and most preferably at least 24 mole %, based on the total number of moles of the diamine component (a), of the aliphatic diamine having more than 6 carbon atoms. Besides, it comprises preferably at most 28 mole %, more preferably at most 27 mole %, and still more preferably at most 26 mole %, based on the total number of moles of the diamine component (a), of the aliphatic diamine having more than 6 carbon atoms.

In a certain preferred polyamide, the diamine component (a) comprises between 71 and 91 mole %, based on the total number of moles of the diamine component (a), of the aliphatic diamine having at most 6 carbon atoms.

The diamine component (a) comprises preferably at most 90 mole %, more preferably at most 85 mole %, still more preferably at most 80 mole %, still more preferably at most 78 mole %, and most preferably at most 76 mole %, based on the total number of moles of the diamine component (a), of the aliphatic diamine having at most 6 carbon atoms. Besides, it comprises preferably at least 72 mole %, more preferably at least 73 mole %, and still more preferably at least 74 mole %, based on the total number of moles of the diamine component (a), of the aliphatic diamine having at most 6 carbon atoms.

Advantageously, the diamine component (a) consists essentially of (or even, consists of) the aliphatic diamine having more than 6 carbon atoms, the aliphatic diamine having at most 6 carbon atoms, and from 0 to 20 mole %, based on the total number of moles of the diamine component (a), of at least one diamine other than the aliphatic diamine having more than 6 carbon atoms and the aliphatic diamine having at most 6 carbon atoms. Preferably, it consists essentially of (or even, consists of) the same, except the 0-20 mole % range is changed to 0-10 mole %. Very preferably, the diamine component (a) consists essentially of (or even, consists of) the aliphatic diamine having more than 6 carbon atoms and the aliphatic diamine having at most 6 carbon atoms.

The diamine other than the aliphatic diamine having more than 6 carbon atoms and the aliphatic diamine having at most 6 carbon atoms may be notably an aromatic diamine, in particular a xylylenediamine such as m-xylylenediamine, p-xylylenediamine and mixtures thereof.

The aliphatic diamine having more than 6 carbon atoms may be notably chosen from 1,8-octanediamine, 1,9-nonanediamine, 2-methyl-1,8-octanediamine, 1,10-decanediamine, 1,12-dodecanediamine, 2,2,4-trimethyl-1,6-hexanediamine, 2,4,4-trimethyl-1,6-hexanediamine and 5-methyl-1,9-nonanediamine; it may also be an alicyclic diamine, e.g. methylcyclohexanediamine and isophoronediamine.

The aliphatic diamine having more than 6 carbon atoms is preferably a $C_7$-$C_{14}$ diamine, more preferably a $C_8$-$C_{10}$ diamine, still more preferably a $C_9$ diamine. Preferably, the $C_9$ diamine is 1,9-nonanediamine (NDA) and/or 2-methyl-1,8-octanediamine (MODA); more preferably, it is a mix of 1,9-nonanediamine (NDA) and 2-methyl-1,8-octanediamine (MODA).

When the aliphatic diamine having more than 6 carbon atoms is a mix of NDA and MODA, the molar ratio [(NDA):(MODA)] is advantageously of at least 1, preferably of at least 2, more preferably of at least 3 and still more preferably of at least 4; besides, it is advantageously of at most 9, preferably of at most 7, and more preferably of at most 6.

The aliphatic diamine having at most 6 carbon atoms may be notably chosen from ethylenediamine, propylenediamine, 1,4-butanediamine, 1,6-hexanediamine, 2-methyl-1,5-pentanediamine and 3-methyl-1,5-pentanediamine.

The aliphatic diamine having at most 6 carbon atoms is preferably a $C_4$-$C_6$ diamine, more preferably a $C_6$ diamine, still more preferably 1,6-hexanediamine.

The dicarboxylic acid component (b) may be free of dicarboxylic acid other than terephthalic acid. Alternatively, it may comprise at least one dicarboxylic acid other than terephthalic acid; examples of such other dicarboxylic acids include: isophthalic acid, naphthalene dicarboxylic acids, and $C_4$-$C_{12}$ aliphatic diacids like adipic acid.

The dicarboxylic acid component (b) comprises preferably at least 60 mole %, and more preferably at least 80 mole %, based on the total number of moles of the dicarboxylic acid component (b), of terephthalic acid; still more preferably, the dicarboxylic acid component (b) consists essentially of (or even consists of) terephthalic acid.

Advantageously, the invented polyamide consists essentially of (or even, consists of) the diamine component (a), the dicarboxylic acid component (b), and from 0 to 20 mole %, based on the total number of moles of the diamine component (a) and the dicarboxylic acid component (b), of at least one component (c) other than the diamine component (a) and the dicarboxylic acid component (b). Preferably, it consists essentially of (or even, consists of) the same, except the 0-20 mole % range is changed to 0-10 mole %. Very preferably, the invented polyamide consists essentially of (or even, consists of) the diamine component (a) and the dicarboxylic acid component (b).

Notwithstanding, in a particular embodiment, the invented polyamide comprises the component (c). The component (c) may then be notably a lactam like ε-caprolactam; it may also be a component reacted with a diacid, such as a diol (the reaction product being then a recurring condensation unit with an ester group, instead of a recurring condensation unit with an amide group, as obtained by reaction of a diacid with a diamine); it may also be a component reacted with a diamine.

In the invented polyamide, the molar ratio of the diamine component (a) and the dicarboxylic acid component (b) [(a):(b)] may be different from 1.00, should for example the polyamide consist essentially of a diacid, a diamine component and a diol, as above explained. The molar ratio of the diamine component (a) and the dicarboxylic acid component (b) [(a):(b)] ranges usually from 5/7 to 7/5, and preferably from 5/6 to 6/5; more preferably, it is essentially equal to (or even, equal to) 1.00.

Excellent results were obtained when the invented polyamide had a melting point between 330° C. and 350° C., and consisted essentially of:

a diamine component (a) consisting essentially of from 20 to 28 mole %, based on the total number of moles of the diamine component (a), of 1,9-nonanediamine and 2-methyl-1,8-octanediamine, in a molar ratio [(NDA):(MODA)] of from 3 to 9, and from 72 to 80 mole %, based on the total number of moles of the diamine component (a), of 1,6-hexanediamine, and a dicarboxylic acid component (b) consisting essentially of terephthalic acid.

A second aspect of the present invention concerns a polyamide composition comprising the polyamide as above described.

The invented polyamide composition may suitably be used as an engineering plastic for high demanding applications, especially for those applications where outstanding thermal properties are required, especially a very high melting point.

The invented polyamide composition may further contain notably a filler, a stabilizer such as a copper compound, a UV absorber, a light stabilizer, an antioxidant (such as a hindered phenol, a hindered amine-, phosphorus- or thio-based antioxidant), an antistatic agent, a flame retardant (such as a brominated polymer, antimony oxide or a metal hydroxide), a nucleating agent, a plasticizer, and/or a lubricant. These ingredients can be added during or after polycondensation of the polyamide.

The invented polyamide and the invented polyamide composition are usable in practice. They can be easily pelletized. They can be molded notably by injection blown, extrusion, compression, drawing or stretching, vacuum forming or like molding processes, into molded articles having the desired shape. They can be formed into shaped articles generally used as engineering plastics, and even into films or fibers, which are suitably used in the fields of industrial materials and household goods, especially where superior thermal and surface properties are required.

Then, a last aspect of the present invention is an article or part of an article comprising the polyamide or the polyamide composition as above described.

EXAMPLE 1

According to the Invention

An autoclave equipped with a condenser, a stirrer, a back-pressure regulator having a bypass valve, a heating jacket containing a circulating heat exchange fluid and a temperature controller, was preheated at 180° F. (82.2° C.) and charged, under stirring (15 rpm), with 99.6 g of 1,9-nonanediamine (0.630 moles), 19.0 g of 2-methyl-1,8-octanediamine (0.120 moles), 383.5 g of an aqueous solution of 1,6-hexanediamine containing 64.9 wt % of said diamine (2.142 moles), and with 490.9 g of terephthalic acid (2.955 moles). The molar amount of 1,9-nonanediamine and 2-methyl-1,8-octanediamine was 25.9 mole % of the total number of moles of the diamine component (1,9-nonanediamine+2-methyl-1,8-octanediamine+1,6-hexanediamine). The molar ratio of 1,9-nonanediamine to 2-methyl-1,8-octanediamine was 5.25. The autoclave was also charged with 5.40 g of glacial acetic acid (0.09 moles), 1.017 g of solid phosphorous acid and 164.3 g of distilled water. The stirring speed was raised at 34 rpm and the air in the autoclave was replaced by nitrogen. The setpoint of the circulating heat exchange fluid was raised to 600° F. (315.5° C.) and the batch reaction was allowed to proceed. After a run time of 70 minutes the internal reactor temperature reached 416° F. (213.3° C.). After a further run time of 60 minutes the internal reactor temperature reached 504° F. (262.2° C.). During this time the reaction mixture changed from an opaque, sticky mass to a low bulk density freely stirring powder. The reactor pressure was kept during the whole duration of the reaction in a range comprised between 107 and 120 psig (7.4 and 8.3 barg) by gradually withdrawing and distilling water via the condenser. After a total run time of 140 minutes, the reactor pressure was reduced over a 5 minutes time period at approximately 25 psig/minute (1.7 barg/minute) by venting the autoclave through the bypass valve.

Once a reactor pressure of 0 psig (0 barg) was reached, the autoclave was purged with nitrogen. The obtained polyamide was recovered through a slide gate located at the bottom of the autoclave. Then, it was dropped into a 5 gallons (18.9 liters) quench bucket of distilled water as a fine white powder.

The melting point of the so-prepared polyamide was measured by Differential Scanning Calorimetry, as previously detailed. It was equal to 346° C.

EXAMPLE 2

Comparative

A polyamide was prepared according to a procedure similar to that described in case of example 1, except that the autoclave was charged with 119.7 g of 1,9-nonanediamine (0.757 moles), 22.8 g of 2-methyl-1,8-octanediamine (0.144 moles), 358.6 g of an aqueous solution of 1,6-hexanediamine containing 70 wt % of said diamine (2.163 moles), and with 490.9 g of terephthalic acid (2.957 moles). The molar amount of 1,9-nonanediamine and 2-methyl-1,8-octanediamine was 29.4 mole %, based on the total number of moles of the diamine component. The molar ratio of 1,9-nonanediamine to 2-methyl-1,8-octanediamine was 5.25. The autoclave was also charged with 5.40 g of glacial acetic acid (0.09 moles), 1.025 g of solid phosphorous acid and 173.7 g of distilled water. The stirring speed was raised at 34 rpm and the air in the autoclave was replaced by nitrogen. The setpoint of the circulating heat exchange fluid was raised to 600° F. (315.5° C.) and the batch reaction was allowed to proceed. After a run time of 70 minutes the internal reactor temperature reached about 600° F. (315.5° C.). Reaction was further effected for 25 minutes at this temperature. The reactor pressure was kept during all the duration of the reaction in a range comprised between 100 and 120 psig (6.9 and 8.3 barg) by gradually withdrawing and distilling water via the condenser. After a total run time of 95 minutes, the reactor pressure was reduced over a 5 minutes time period at approximately 25 psig/minute (1.7 barg/minute) by venting the autoclave through the bypass valve. Once a reactor pressure of 0 psig (0 barg) was reached, the autoclave was purged with nitrogen and the obtained polyamide was recovered as previously described for example 1.

The melting point of the so-prepared polyamide was measured by Differential Scanning Calorimetry, as previously detailed. It was equal to 326° C.

EXAMPLE 3

Comparative

A steam-heated, stainless steel, stirred salt reactor was charged with 8,216 g of 1,9-nonanediamine (52.005 moles), 1,565 g of 2-methyl-1,8-octanediamine (9.905 moles), 10,044 g of an aqueous solution of 1,6-hexanediamine containing 71.5 wt % of said diamine (61.822 moles), and with 19,638 g of terephthalic acid (118.301 moles). The molar amount of 1,9-nonanediamine and 2-methyl-1,8-octanediamine was 50.0 mole % of the total number of moles of the diamine component. The molar ratio of 1,9-nonanediamine to 2-methyl-1,8-octanediamine was 5.25. The stirred salt reactor was also charged with 38.3 g of sodium hypophosphite, 216 g of glacial acetic acid (3.6 moles) and 15,290 g of distilled water. The amount of excess water in the feed batch was 33 wt %. The air in the salt reactor was replaced by nitrogen. A salt solution was obtained by heating the above described mixture at 260° F. (126.6° C.) while keeping the pressure in the salt reactor at 43 psig (3 barg). The contents of the salt reactor were pumped continuously to a jacketed, oil-heated concentrator fitted with a control valve to vent volatiles, and maintained under pressure of about 160 psig-185 psig (11 barg-12.8 barg) while heating the contents to about 428° F.-437° F. (220° C.-225° C.). In the concentrator, the salt begun to react providing a prepolymer and the excess water was stripped off the solution. The water content of the reaction mixture exiting the concentrator was reduced to less than about 15 wt %. The reaction mixture was continuously pumped from the concentrator to and through two oil-heated, stainless steel preheaters, arranged in series. In the preheaters, the melt temperature was maintained at about 590° F. (310° C.) and the pressure at about 1800 psig (124 bar). The water content of the reaction mixture was maintained at around 7 wt %. The reaction mixture exited the second preheater continuously through a control valve and was fed into a jacketed tubular reactor at a pressure of about 100 psig (6.9 barg). The jacketed tubular reactor was heated to wall temperature of about 630° F. (332° C.) by circulating heat exchange fluid through the heating jacket. Part of the water still present in the reaction mixture flashed into steam and the prepolymer was sprayed as "droplets". The prepolymer (more than 90% converted) and some residual water passed through another control valve to exit the tubular reactor and were introduced onto the screws of a vented Werner and Pfleiderer Corporation ZSK-30® twin-screw extruder using a vent vacuum at the downstream (die end) port. Die temperature was set at 635° F. (335° C.). The residual steam was separated from the prepolymer and left the extruder through a rear vent. The prepolymer traveled forward through the extruder (100 rpm), undergoing additional reaction to full conversion. The finished polymer was extruded through a strand die into a water bath at a through-put rate of about 5.5-6.5 kg/hr and then chopped into pellets.

The melting point of the so-prepared polyamide was measured by Differential Scanning Calorimetry, as previously detailed. It was equal to 306° C.

EXAMPLE 4

Comparative

A polyamide was prepared according to the same procedure described in case of example 3, except that the stirred salt reactor was charged with 16,380 g of 1,9-nonanediamine (103.670 moles), 3,121 g of 2-methyl-1,8-octanediamine (19.753 moles), 6,896 g of an aqueous solution of 1,6-hexanediamine containing 70 wt % of said diamine (41.613 moles), and with 26,184 g of terephthalic acid (157.734 moles). The amount of excess water in the feed batch was 32.3 wt %. The molar amount of 1,9-nonanediamine and 2-methyl-1,8-octanediamine was 74.7 mole % of the total number of moles of the diamine component. The molar ratio of 1,9-nonanediamine to 2-methyl-1,8-octanediamine was 5.25. The stirred salt reactor was also charged with 53.1 g of sodium hypophosphite, 288 g of glacial acetic acid (4.8 moles) and 22,989 g of distilled water.

The melting point of the so-prepared polyamide was measured by Differential Scanning Calorimetry, as previously detailed. It was equal to 281° C.

EXAMPLE 5

Comparative

A polyamide was prepared according to the same procedure described in case of example 3, except that the stirred salt reactor was charged with 22,018 g of 1,9-nonanediamine (139.360 moles), 4,194 g of 2-methyl-1,8-octanediamine (26.544 moles) and with 26,184 g of terephthalic acid (157.734 moles). The molar ratio of 1,9-nonanediamine to 2-methyl-1,8-octanediamine was 5.25. The stirred salt reactor was also charged with 55.2 g of sodium hypophosphite, 288 g of glacial acetic acid (4.8 moles) and 25,976 g of distilled water. The amount of excess water in the feed batch was about 33 wt %.

The melting point of the so-prepared polyamide was measured by Differential Scanning Calorimetry, as previously detailed. It was equal to 306° C.

Influence of the $C_9$ Diamine Content on the Melting Point—Graphical Representation For convenience, the melting point (in ° C.) of the above exemplified polyamides, and of other previously described ones, was plotted in FIG. 1 as a function of their $C_9$ diamine molar content.

The ▲ corresponds the approximate melting point of PA(6, T) homopolymer as reported in various scientific sources. The * corresponds to the melting point reported in section [0047] of JP 2000/191771, as above commented. Finally, the ● corresponds to the melting points measured made by the Applicant.

The polyamide of example 1 (according to the present invention) exhibits an outstandingly high melting point, namely 346° C.

Thermal Stability of the Polyamide of Example 1 at its Processing Temperature

The Applicant, which has gained a big technical expertise in the field of polyamides, has developed over the years a quite simple but reliable test to assess whether a polyamide can be melt processed without incurring any substantial degradation.

The challenge for the polyamide of example 1 is that, because of its very high melting point, it needs to be processed at a still higher processing temperature, usually at least about 5° C. above its melting point; at such a higher processing temperature, it might, not only prima facie but also in the light of certain KURARAY's prior art teachings, be subject to incur substantial thermal degradation.

The Applicant's test consists in measuring a certain critical degradation temperature, and comparing it with the minimum processing temperature of the polyamide.

The minimum processing temperature of the polyamide ($T_{p,min}$) is defined as the melting point of the polyamide ($T_m$)+5° C. It can be measured by DSC, as above explained.

The critical degradation temperature of the polyamide ($T_d$) is measured by thermogravimetric analysis, using a uniform heat rate of 10° C.; typically, the weight loss rate increases as a function of time. $T_d$ is the temperature at which the weight loss rate (dW/dt, where W is the weight of the tested polyamide, and t is the time) reaches 0.1%/min.

The melt processing window, if any, is defined as [$T_{p,min}$, $T_d$]; its width is equal to $T_{p,min}-T_d$.

The polyamide of example 1 was tested accordingly.

Its minimum processing temperature $T_{p,min}$ was equal to 346+5=351° C.

Its critical degradation temperature $T_d$ was also determined; it was equal to 359° C.

The polyamide of example 1, in contrast with what the skilled in the art would have expected, especially based on the teachings of JP 2000/191771, was shown to be usable in practice, with a melt processing window as high as 8° C.

It should be further pointed out that the polyamide of example 1 was synthesized at lab scale, using higher amounts of catalyst as needed at industrial scale. Now, catalyst residues in the polyamide are known to degrade substantially its thermal stability, without changing in any way its melting point. Consequently, a polyamide such as the polyamide of example 1 but that would be synthesized at industrial scale would inevitably exhibit a higher critical degradation temperature, and, thus, a broader processing window.

As an additional advantage, the polyamide of example 1 is less expensive than KURARAY's prior art polyamides, because its $C_9$ diamine content is as low as 25.9 mole %.

The invention claimed is:

1. A polyamide having a melting point between 330° C. and 370° C., said polyamide comprising:
    a diamine component (a) comprising consisting essentially of at least 22 mole % and at most 28 mole %, based on the total number of moles of the diamine component (a), of at least one aliphatic diamine having more than 6 carbon atoms selected from 1,9-nonanediamine and 2-methyl-1,8-octanediamine, and at least 72 mole % and at most 78 mole %, based on the total number of moles of the diamine component (a), of 1,6-hexanediamine, and
    a dicarboxylic acid component (b) consisting essentially of terephthalic acid.

2. The polyamide according to claim 1, which has a melting point greater than 335° C.

3. The polyamide according to claim 1, which has a melting point below 350° C.

4. The polyamide according to claim 3, which has a melting point of at most 346° C.

5. The polyamide according to claim 1, wherein the diamine component (a) comprises at least 24 mole %, based on the total number of moles of the diamine component (a), of the aliphatic diamine having more than 6 carbon atoms.

6. The polyamide according to claim 1, wherein the diamine component (a) comprises at most 27 mole %, based on the total number of moles of the diamine component (a), of the aliphatic diamine having more than 6 carbon atoms.

7. The polyamide according to claim 1, wherein the diamine component (a) consists of the aliphatic diamine having more than 6 carbon atoms and the aliphatic diamine having at most 6 carbon atoms.

8. The polyamide according to claim 1, wherein the aliphatic diamine having more than 6 carbon atoms is 1,9-nonanediamine.

9. The polyamide according to claim 1, wherein the aliphatic diamine having more than 6 carbon atoms is a mix of 1,9-nonanediamine (NDA) and 2-methyl-1,8-octanediamine (MODA), in a molar ratio [(NDA):(MODA)] of at least 4.

10. The polyamide according to claim 9, wherein the molar ratio [(NDA):(MODA)] is of at most 6.

11. The polyamide according to claim 1, wherein the aliphatic diamine having at most more than 6 carbon atoms is 2-methyl-1,8-octanediamine.

12. The polyamide according to claim 1, which consists essentially of the diamine component (a), the dicarboxylic acid component (b), and from 0 to 20 mole %, based on the total number of moles of the diamine component (a) and the dicarboxylic acid component (b), of at least one component (c) other than the diamine component (a) and the dicarboxylic acid component (b).

13. The polyamide according to claim 12, which comprises the component (c), said component (c) being a lactam.

14. The polyamide according to claim 12, which consists essentially of the diamine component (a) and the dicarboxylic acid component (b).

15. A polyamide composition comprising the polyamide according to claim 1.

16. An article or a part of an article comprising the polyamide according to claim 1.

17. An article or a part of an article comprising the polyamide composition according to claim 15.

18. The polyamide according to claim 1, wherein said polyamide consists of the diamine component (a) and the dicarboxylic acid component (b), and wherein:

the diamine component (a) consists of the aliphatic diamine having more than 6 carbon atoms and the aliphatic diamine having at most 6 carbon atoms, and the dicarboxylic acid component (b) consists of terephthalic acid.

19. The polyamide according to claim 1, said polyamide comprising:

a diamine component (a) comprising at least 24 mole % and at most 28 mole %, based on the total number of moles of the diamine component (a), of at least one aliphatic diamine having more than 6 carbon atoms, and at least 72 mole % and at most 76 mole %, based on the total number of moles of the diamine component (a), of at least one aliphatic diamine having at most 6 carbon atoms.

20. The polyamide according to claim 1, said polyamide having a melting point between 330° C. and 350° C. wherein:

diamine component (a) consists essentially of 1,9-nonanediamine (NDA) and 2-methyl-1,8-octanediamine (MODA), in a molar ratio [(NDA):(MODA)] of from 3 to 9, and 1,6-hexanediamine.

21. A polyamide as claimed in claim 1, wherein said polyamide consists essentially of said diamine component (a) and said dicarboxylic acid component (b), and wherein:

said diamine component (a) consists of at least 22 mole % and at most 26 mole %, based on the total number of moles of the diamine component (a), of at least one aliphatic diamine having more than 6 carbon atoms selected from 1,9-nonanediamine and 2-methyl-1,8-octanediamine, and at least 74 mole % and at most 78 mole %, based on the total number of moles of the diamine component (a), of 1,6-hexanediamine, and said dicarboxylic acid component (b) consists of terephthalic acid.

22. The polyamide according to claim 21, wherein said diamine component (a) consists of at least 22 mole % and at most 26 mole %, based on the total number of moles of the diamine component (a), of a mix of 1,9-nonanediamine (NDA) and 2-methyl-1,8-octanediamine (MODA), in a molar ratio [(NDA):(MODA)] of at least 4 and at most 6.

* * * * *